US012754198B2

(12) United States Patent
Haselhuhn, Jr.

(10) Patent No.: US 12,754,198 B2
(45) Date of Patent: Oct. 6, 2026

(54) SENSOR HAVING LOW POWER MOVEMENT DETECTION

(71) Applicant: Allegro MicroSystems, LLC, Manchester, NH (US)

(72) Inventor: Howard J. Haselhuhn, Jr., Brighton, MI (US)

(73) Assignee: Allegro MicroSystems, LLC, Manchester, NH (US)

( * ) Notice: Subject to any disclaimer, the term of this patent is extended or adjusted under 35 U.S.C. 154(b) by 256 days.

(21) Appl. No.: 18/391,834

(22) Filed: Dec. 21, 2023

(65) Prior Publication Data

US 2024/0402210 A1 Dec. 5, 2024

Related U.S. Application Data

(60) Provisional application No. 63/505,780, filed on Jun. 2, 2023.

(51) Int. Cl.
*G01P 3/44* (2006.01)

(52) U.S. Cl.
CPC .................................... *G01P 3/44* (2013.01)

(58) Field of Classification Search
CPC ........................................................ G01P 3/44
See application file for complete search history.

(56) References Cited

U.S. PATENT DOCUMENTS 6,727,689 B1 * 4/2004 Furlong .................. G01P 3/489
327/60
7,714,570 B2 5/2010 Thomas et al.
7,911,203 B2 3/2011 Thomas et al.
7,994,774 B2 8/2011 Thomas et al.
8,008,908 B2 8/2011 Doogue et al.
8,209,081 B2 * 6/2012 Joyce ...................... G01P 21/02
701/31.2
8,222,888 B2 7/2012 David et al.
8,749,227 B2 6/2014 Thomas et al.
9,625,534 B2 4/2017 Cadugan et al.
9,810,519 B2 11/2017 Taylor et al.
9,823,092 B2 11/2017 David et al.
10,380,879 B2 8/2019 Haas et al.
10,488,427 B2 * 11/2019 Koh ...................... H02K 29/08
10,852,161 B2 12/2020 Cesaretti et al.
2011/0031965 A1 2/2011 Saruki et al.
2012/0095712 A1 4/2012 Komasaki et al.
2012/0262155 A1 10/2012 Donovan et al.
2014/0306692 A1 10/2014 Santos et al.
2015/0333752 A1 11/2015 Motz
2016/0169707 A1 6/2016 Hirota et al.
(Continued)

OTHER PUBLICATIONS

U.S. Notice of Allowance dated Oct. 19, 2020 for U.S. Appl. No. 16/398,522; 13 Pages.
(Continued)

*Primary Examiner* — Reena Aurora
(74) *Attorney, Agent, or Firm* — DALY, CROWLEY, MOFFORD & DURKEE, LLP

(57) ABSTRACT

Methods and apparatus for speed sensor having a first detection module with a first sensing element. The first detection module is configured to detect movement of a target during a first mode of operation and a second detection module is configured to detect movement of the target during a low power mode of operation.

18 Claims, 6 Drawing Sheets

(56) References Cited

U.S. PATENT DOCUMENTS

| | | | |
|---|---|---|---|
| 2019/0113584 | A1 | 4/2019 | Cook et al. |
| 2020/0049729 | A1 | 2/2020 | Jeon et al. |
| 2022/0325766 | A1 | 10/2022 | House et al. |

OTHER PUBLICATIONS

Extended European Search Report dated Sep. 24, 2024 for European Application No. 24177486.8; 8 Pages.

Response to Extended European Search Report (EESR) dated Sep. 24, 2024 for European Application No. 24177486.8; Response Filed Mar. 27, 2025; 14 Pages.

* cited by examiner

SENSOR HAVING LOW POWER MOVEMENT DETECTION

CROSS REFERENCE TO RELATED APPLICATIONS

The present application claims the benefit of U.S. Provisional Patent Application No. 63/505,780, filed on Jun. 2, 2023, which is incorporated herein by reference.

BACKGROUND

As is known in the art, speed sensors can be used to detect movement of targets. However, some applications are power consumption sensitive, such as electric vehicles which are battery powered. At times, electric vehicles are parked and speed sensors can be used to detect undesired wheel movement. However, constantly monitoring wheel movement while a vehicle is parked can require undesirable levels of power consumption. However, monitoring wheel movement is desirable to prevent unwanted vehicle movement, which can create dangerous situations.

In addition, conventional sensors may require an entire tooth on a target to pass the sensing elements to obtain a rising and falling edge, which may translate to relatively large movement of the target and/or vehicle.

SUMMARY

In one aspect, a speed sensor includes a first detection module having a first sensing element, wherein the first detection module is configured to detect movement of a target during a first mode of operation; and a second detection module having a second sensing element, wherein the second detection module is configured to detect movement of the target during a low power mode of operation.

A speed sensor can further include one or more of the following features: the second detection module is configured to detect movements at selected time intervals, the second detection module is configured to compare an output of the second sensing element to a threshold at the selected time intervals, the second detection module is configured to generate a wake up signal when the output of the second sensing element exceeds the threshold, the first sensing element comprises GMR elements, the second sensing element comprises a Hall element, the target comprises an ABS tone ring, the target comprises a ring magnet, and/or the first detection module comprises a current source controlled by a controller and the second detection module comprises a comparator coupled to the current source.

In another aspect, a method comprises: employing a first sensing element in a first detection module in a speed sensor to detect movement of a target during a first mode of operation; and employing a second sensing element in a second detection module to detect movement of the target during a low power mode of operation.

A method can further include one or more of the following features: the second detection module is configured to detect movements at selected time intervals, the second detection module is configured to compare an output of the second sensing element to a threshold at the selected time intervals, the second detection module is configured to generate a wake up signal when the output of the second sensing element exceeds the threshold, the first sensing element comprises GMR elements, the second sensing element comprises a Hall element, the target comprises an ABS tone ring, the target comprises a ring magnet, and/or the first detection module comprises a current source controlled by a controller and the second detection module comprises a comparator coupled to the current source.

In a further aspect, a speed sensor comprises: a first means for detecting movement of a target during a first mode of operation; and a second means for detecting movement of the target during a low power mode of operation. The second means for detecting movement may be configured for detecting movements at selected time intervals. The second means for detecting may be configured to compare an output of the second sensing element to a threshold at the selected time intervals.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein.

DETAILED DESCRIPTION

Figure 1:
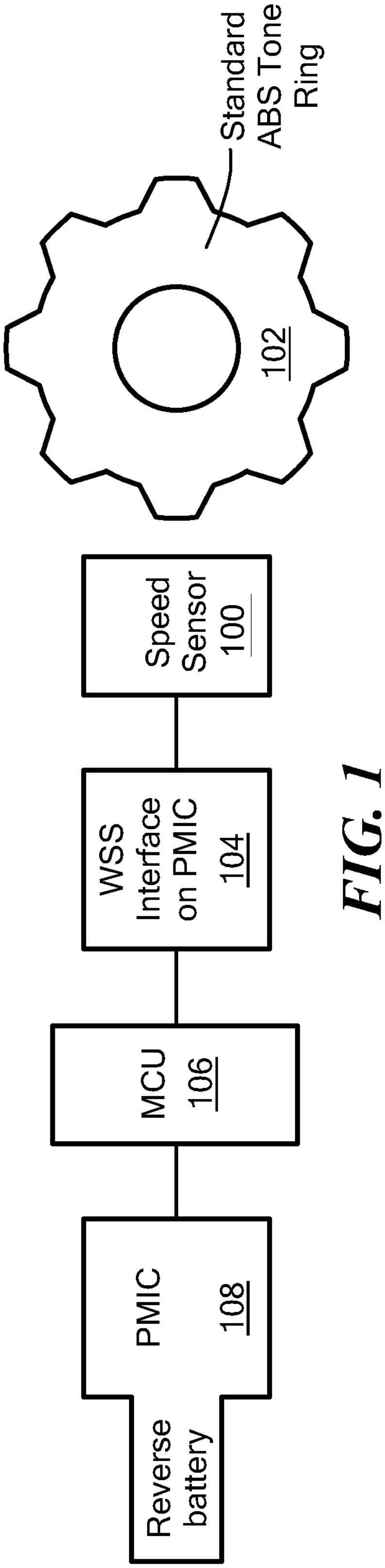
FIG. 1 shows an example speed sensor having low power movement detection, in accordance with the present disclosure.

FIG. 1 shows an example speed sensor 100 having low power movement detection, such as detection that a parked vehicle is moving. Example embodiments of the disclosure are useful for electric vehicles which may not have a conventional mechanical parking brake. While example embodiments of the disclosure are shown and described in conjunction with an anti-lock braking system (ABS) for an electric vehicle, embodiments of the disclosure are applicable to any mechanical and/or electromechanical system for which low power movement detection is desirable.

In the illustrated system, the speed sensor 100 is positioned in relation to a magnetic and/or ferromagnetic target 102, such as an ABS tone ring secured to a wheel of a vehicle. As described more fully below, the speed sensor 100 includes low power detection of wheel movement. The speed sensor 100 is coupled to a wheel speed sensor (WSS) interface 104, which may be coupled to a motor control unit (MCU) 106. A power management IC (PMIC) 108 can be connected to the MCU 106. In some embodiments, WSS interface 104 can be part of the PMIC 108.

In embodiments, during lower power mode the speed sensor 100 can detect target tone ring 102 movement as compared to waiting for a pole or tooth to completely pass the sensor in conventional sensor configurations.

Figure 2:
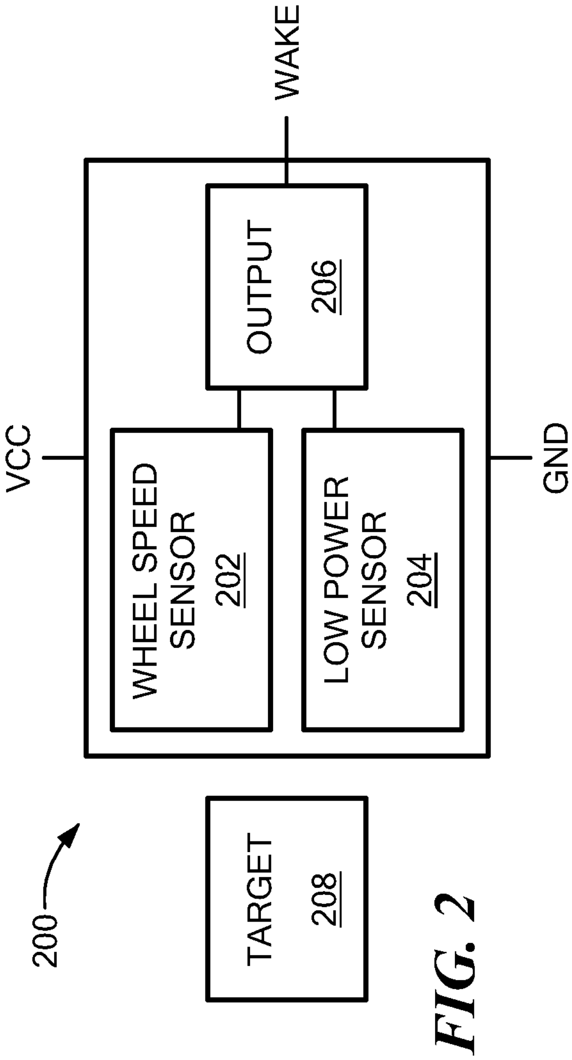
FIG. 2 shows an example speed sensor having a wheel speed sensor and a low power sensor coupled to an output module.

FIG. 2 shows an example speed sensor 200 having a wheel speed sensor 202 and a low power sensor 204 coupled to an output module 206. The wheel speed sensor 202 detects rotation of a target 208, such as a wheel, during operation, e.g., normal driving conditions. The low power sensor 204 operates during low power operation of the speed sensor 200, such as when the vehicle is not moving. The low power sensor 204 detects movement of the wheel and generates a wake signal via the output module 206 to wave up the control unit so that brake pressure can be increased to stop further movement. In one example scenario, an electric vehicle is parked on an inclined surface and loaded with cargo, which causes the vehicle to begin moving. If the brake pad pressure is not increased, the vehicle will continue moving which may lead to dangerous situations. In another example scenario, a vehicle is parked while the brake rotors are hot which can may result in insufficient clamp pressure after the rotors cool. Example embodiments of a speed sensor can sense even subtle motion and wake up the controller to perform a cold reclamp to prevent the vehicle from moving.

Figure 2A:
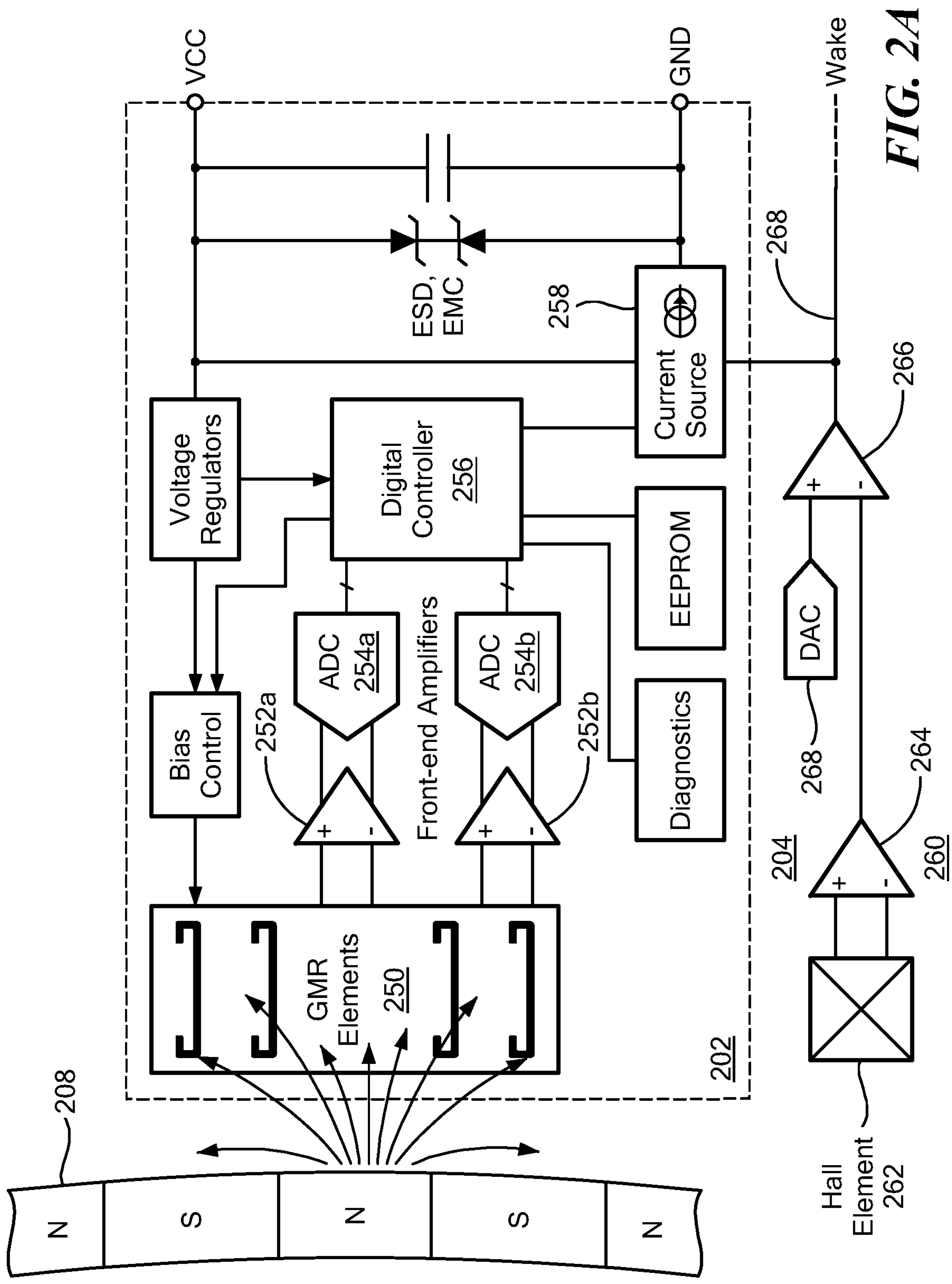
FIG. 2A shows an example implementation of the speed sensor of FIG. 2.

FIG. 2A shows an example implementation of the speed sensor 200 of FIG. 2. The wheel speed sensor includes a first sensing module 250 having magnetic field sensing elements, such as GMR elements coupled in a bridge configuration with element outputs coupled to respective front end amplifiers 252*a,b*. The GMR elements are configured in differential pairs to provide electrical signals containing data regarding tone ring tooth edge position and direction of rotation. Ring magnet targets can be used as the sensor detects the peaks of the magnetic signals and sets dynamic thresholds based on these detected signals. The amplifier 252*a,b* outputs can be digitized by respective ADCs 254*a,b* and provided to a controller module 256, which is coupled to a current source 258. It is understood that differential pairs can comprise differential pairs and/or a bridge connection architecture, for example.

In the illustrated embodiment, a low power sensor 204 includes a second sensing module 260 comprising a Hall element 262 the outputs of which are amplified 264 to provide a voltage level to a comparator 266 for comparing the amplified Hall element signal against an analog threshold voltage from a DAC 268. If the Hall element signal at the comparator 266 exceeds the threshold, a wake signal 268 is activated.

While shown separately, in some embodiments, the first and second sensing modules 250, 260 are integrated in a circuit and powered and connected appropriately to achieve normal and low power operation and target movement sensing. For example, the Hall element 262 may be located next to one or more of the GMR elements.

It is understood that any suitable magnetic field sensing element, such as MR (GMR, TMR, AMR, Hall, CVH, etc.) can be used for the first and second sensing modules to meet the needs of a particular application. In embodiments in which the sensing element has a sufficiently low power, a single sensing element can be used so a lower Iq can be managed, such as by splitting the normal data path and the LPM data path into separate power domains so that the normal path can be turned off during LPM to save current.

Figure 3:
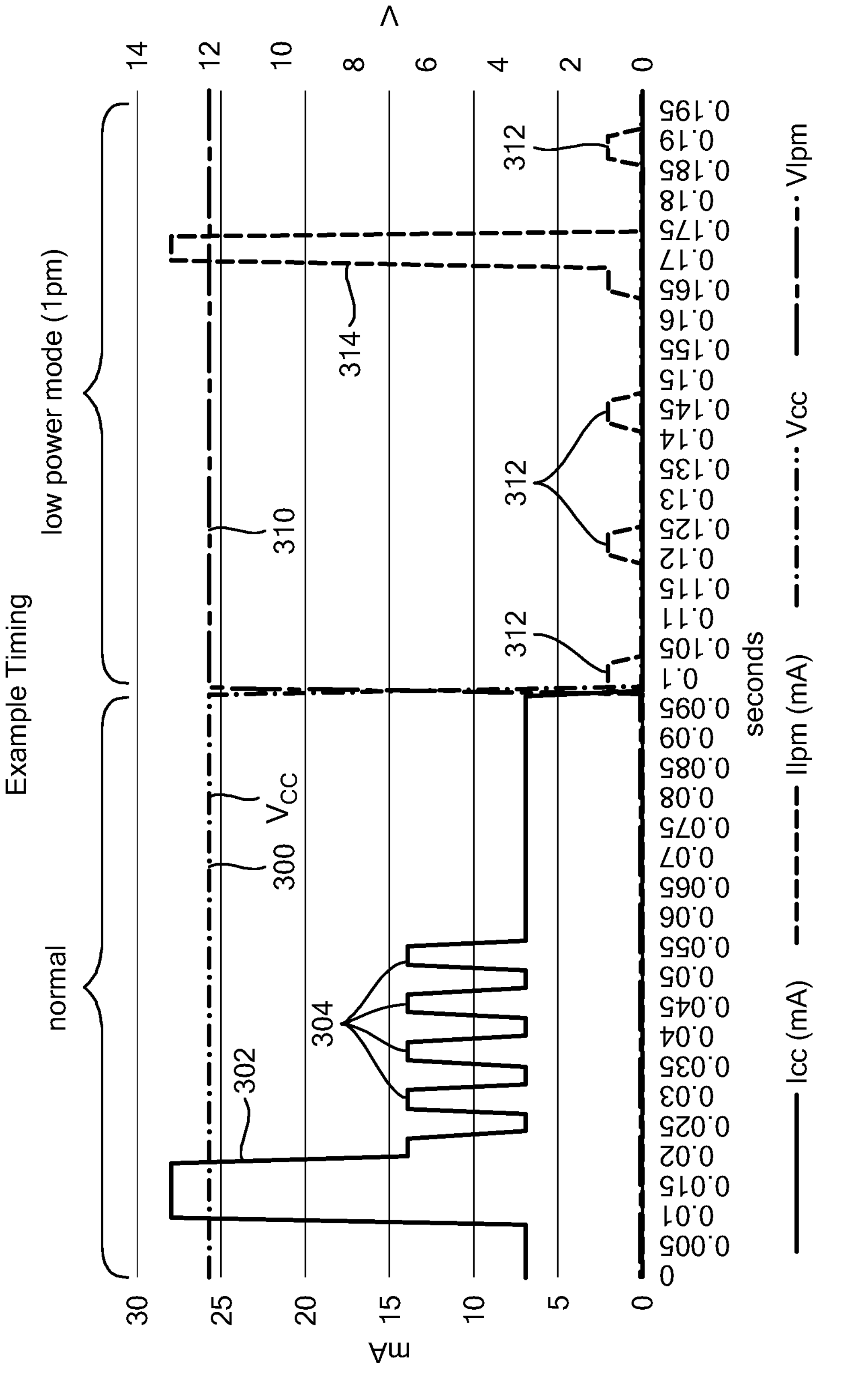
FIG. 3 shows an example waveform diagram showing operation of a speed sensor having low power movement detection.

FIG. 3 shows an example waveform diagram showing operation of a speed sensor having low power movement detection. A supply voltage 300 and a supply current 302 for the sensor are shown during normal wheel rotation generating pulses 304 indicative of rotation speed, such as the AK protocol. For example, a 4-event per cycle AK Protocol uses 28 mA speed pulses for every event and operates continuously throughout the full frequency range using standard bit truncation at higher speeds. An 8-event AK Protocol option uses 14 mA speed pulses for high-resolution events and features an automatic crossover to standard-resolution at higher speeds, maximizing the available bandwidth of a two-wire interface.

During low power operation, which can be referred to as sleep mode, the supply voltage 300, which supplies the wheel speed sensor 202 (FIG. 2A), is reduced. A low power voltage 310 is supplied to the low power sensor 204, which performs checks at selected time intervals at which the voltage from the Hall element 262 is compared to the threshold voltage at the comparator 266. Small pulses 312 of current increases indicate that the threshold voltage has not exceeded. If the threshold is exceeded, a large wake pulse 314 is generated indicating the threshold voltage has been exceeded. In the illustrated embodiment, the wake pulse 314 wakes up the current source 258, which causes the entire sensor to exit low power mode. In example embodiments, a wake pulse 314 is indicative of movement of the vehicle so that brake pad pressure should be increased.

In the illustrated embodiment, wakeup pulse 314 during low power mode (LPM) is shown as 28 mA. It is understood that any suitable current level above the normal operating current of the device can be used. In embodiments, a wakeup pulse current of a few mA above the operating current is used so the LPM supply can have a relatively compact configuration.

Figure 4:
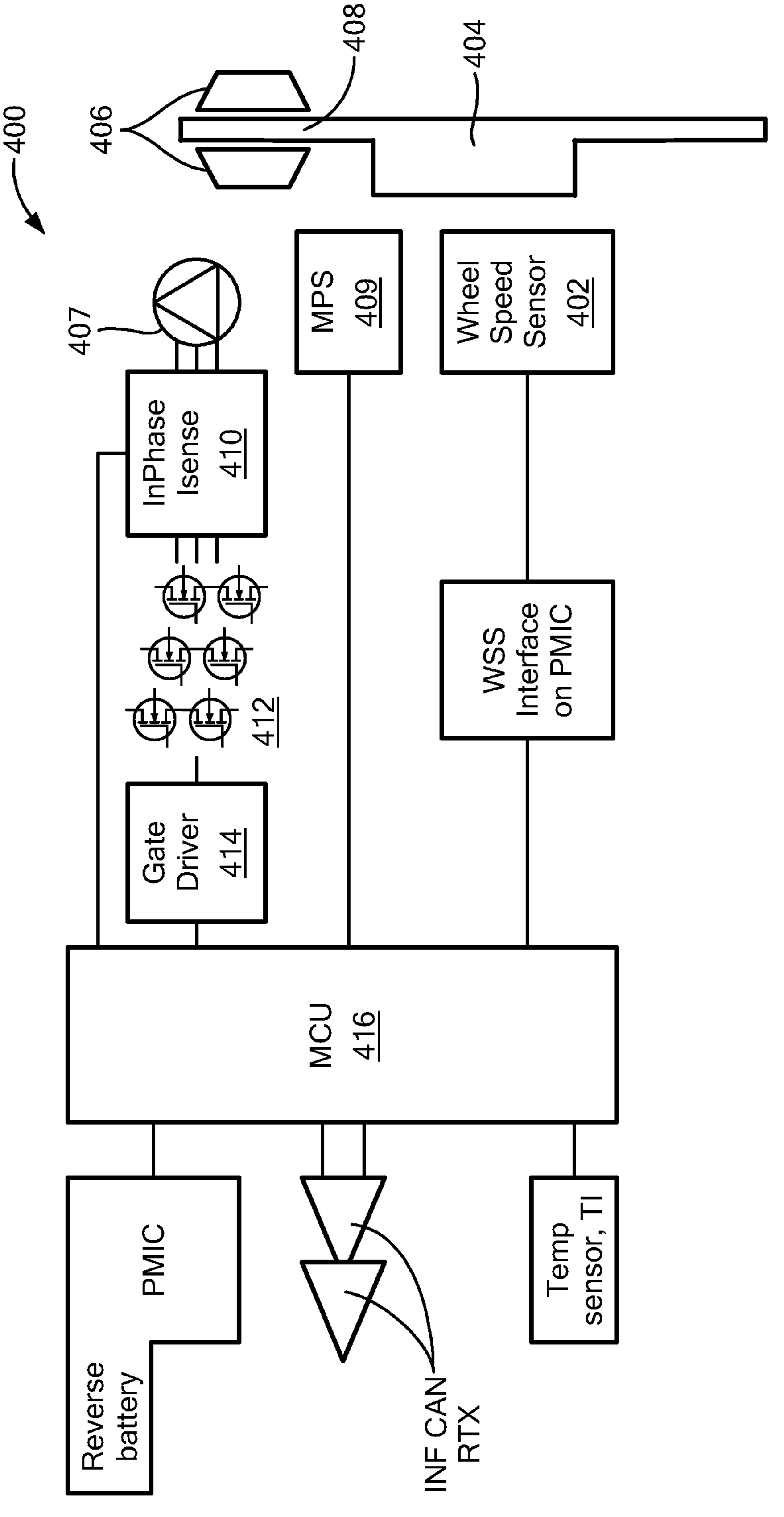
FIG. 4 shows an example system 400 having a speed sensor with low power movement detection positioned in relation to an ABS tone ring.

FIG. 4 shows an example system 400 having a speed sensor 402 with low power movement detection positioned in relation to an ABS tone ring 404. Brake pads 406 squeeze a rotor 408 to slow down or stop wheel movement under the control of a three phase electric motor 407. An angle sensor 409 can determine an angular position of the motor 407. A sensor IC 410 can monitor power, voltage, and current for AC and DC signals from a series of power switches 412 coupled to gate drivers 414 controlled by an MCU 416, for example.

Example embodiments of speed sensors having low power movement detection can be implemented for any suitable voltage levels, such as 12V, 48V, and/or combinations of voltages in a vehicle. It is understood that a lower Vcc provides lower Iq and enables more frequent measurements while maintaining the targeted Iavg (average current). The sensor sleep mode may be configurable to control an amount of vehicle movement allowed before waking up the braking system if the sensor detects movement. In embodiments, any suitable communication protocol can be used, such as standard wheel speed sensor protocols PWM and AK Protocol communication.

Figure 5:
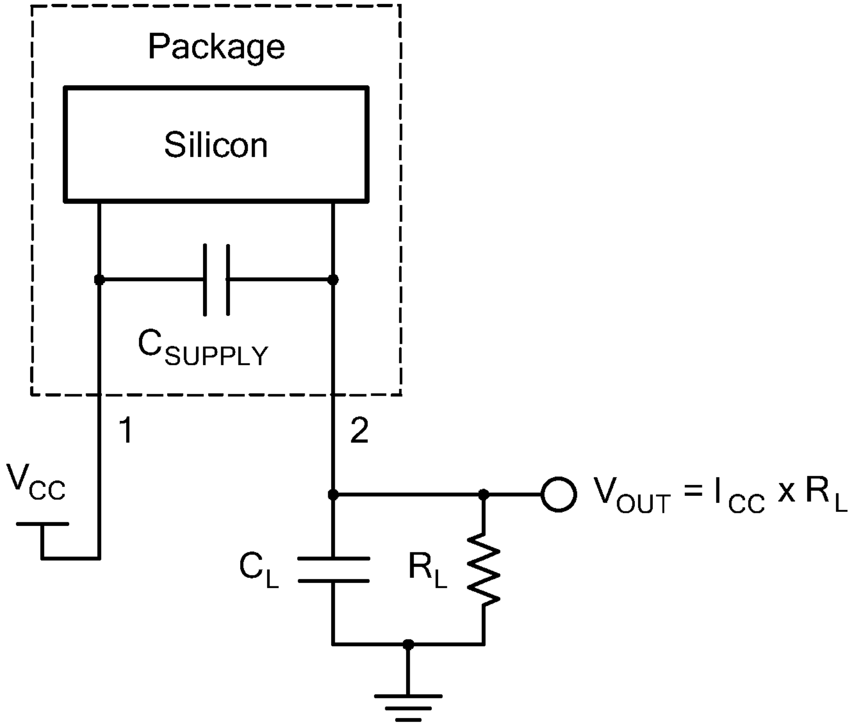
FIG. 5 shows an example speed sensor having low power movement detection in an IC package with an example configuration of external components.

FIG. 5 shows an example speed sensor having low power movement detection in an IC package with an example configuration of external component comments. The illustrated embodiment shows an IC package having a two-pin configuration in which movement and wake signals are provided on the Vcc terminal for example. In other embodiments, such as that shown in FIG. 2, a three pin configuration includes an external pin on which a wake signal indicative of wheel movement during low power operation can be provided. A wake signal can comprise, for example, an increased load current pulse or a voltage pulse on the third pin. A third pin can be powered separately to enable LPM and disable higher current normal operating mode.

Figure 6:
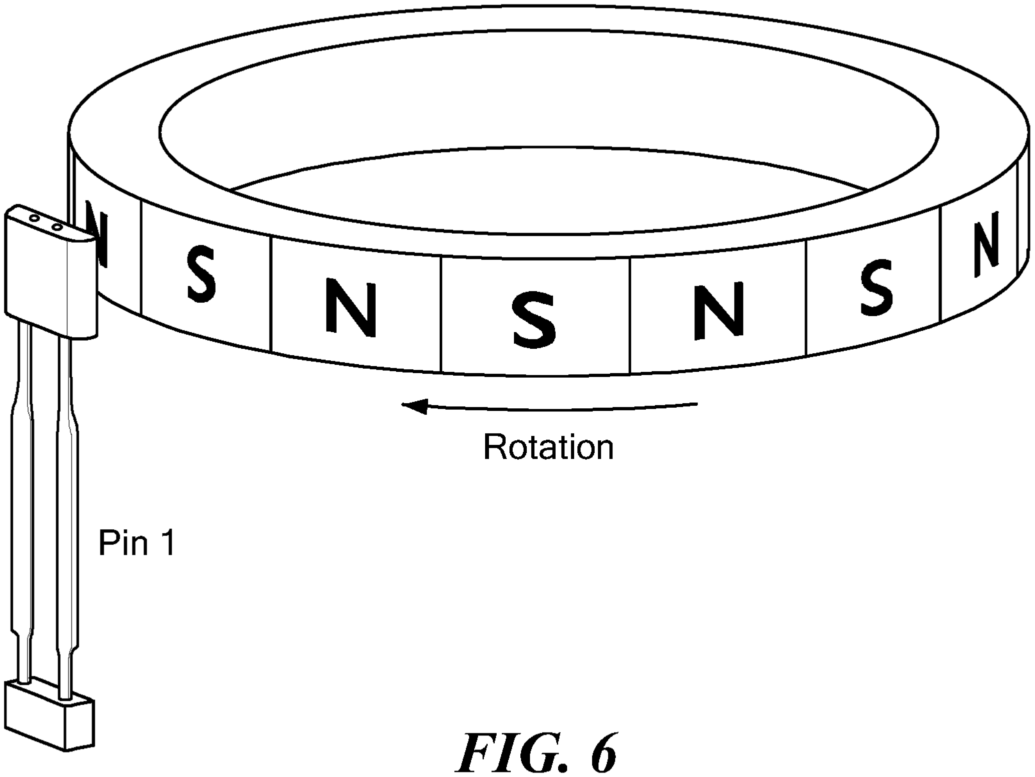
FIG. 6 shows an example speed sensor configured in relation to a target in the form of a ring magnet.

FIG. 6 shows an example speed sensor configured in relation to a target in the form of a ring magnet.

In embodiments, low power movement detection provides significant average current reduction as compared to conventional sensors. During normal operation when the AK protocol, for example, is detecting tone ring movement from rising and falling pole edges, current levels may be in the order of 14-28 mA. During sleep mode, sensors having low power movement detection in accordance with embodiments of the disclosure may draw in the order of less than 10 microAmps for the Hall element, amp, and comparator, for example. This is achieved by low power movement sensing while other parts of the sensor are in sleep mode.

Example embodiments of a speed sensor can include one or more of the following features: low current during LPM to enable use while vehicle is turned off in effort to conserve battery power, less than 10 uA average current draw during LPM, high current wake pulse is connected to a wakeup pin on a regulator to trigger the wakeup process of the system, automatically enter LPM when sensor detects no movement for more than a predetermined wait period, automatically come out of LPM when movement of the wheel is detected (change in measured field strength), compatible with 12V, 48V, or combination of voltages in a vehicle, configurable sleep period during Low Power Mode to control amount of vehicle movement allowed, wake braking system if sensor detects movement, supports existing standard wheel speed sensor protocols during normal operation, such as PWM and AK Protocol communications, during Low Power Mode, LPM, detect target tone ring movement instead of waiting for a pole or tooth to completely pass the sensor, 2 pin or 3 pin modes that will either wake the system with an increased load current pulse or a voltage pulse on the third pin, third pin powered separately to enable LPM and disable higher current normal operating mode, a configurable sleep period during LPM to control the Iavg during LPM and control the amount of vehicle movement allowed, and/or LPM entry if Vcc is reduced to some predefined level, such as 5V.

Figure 7:
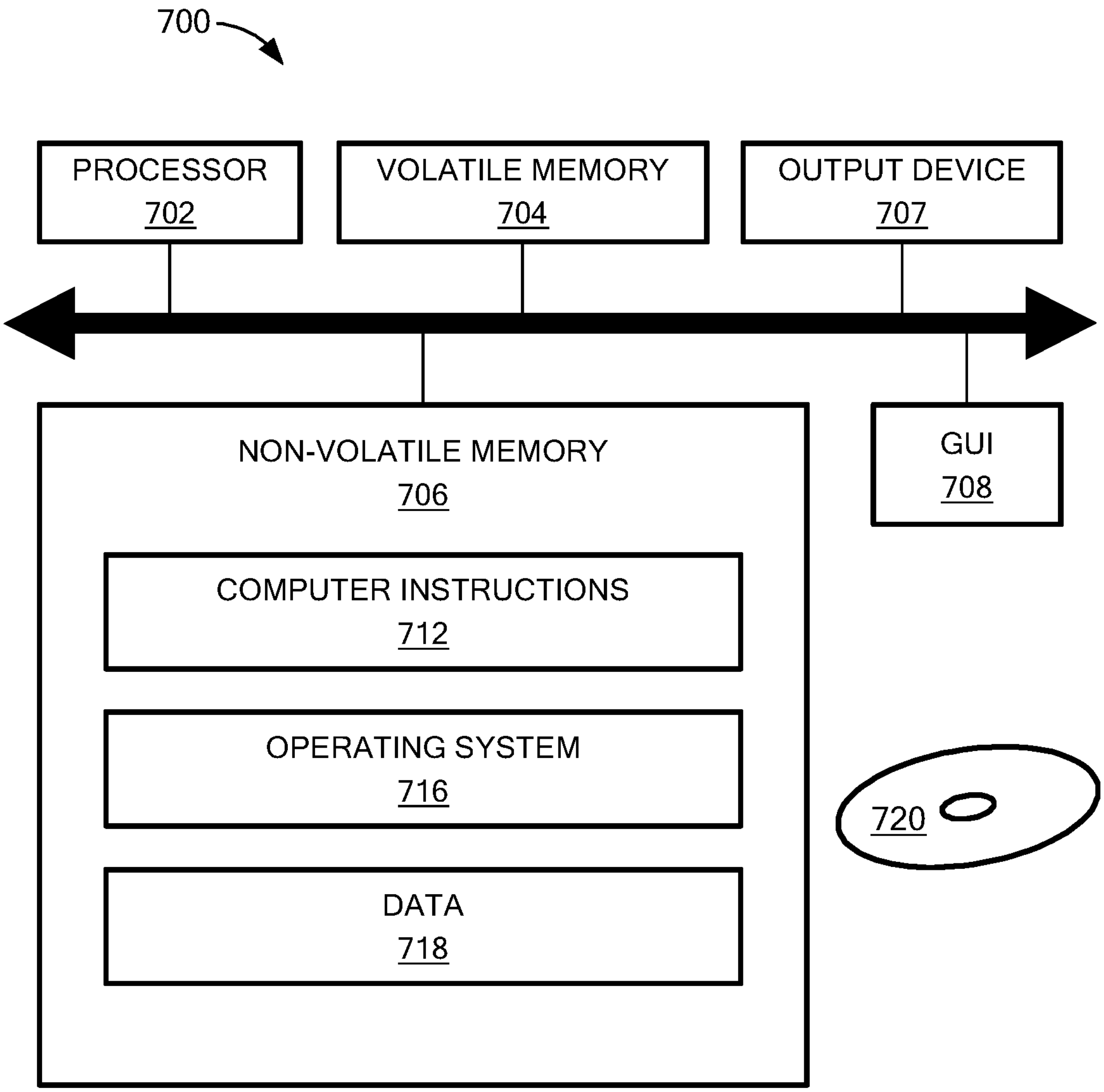
FIG. 7 is a schematic representation of an example computer than can perform at least a portion of the processing described herein.

FIG. 7 shows an exemplary computer 700 that can perform at least part of the processing described herein. The computer 700 includes a processor 702, a volatile memory 704, a non-volatile memory 706 (e.g., hard disk), an output device 707 and a graphical user interface (GUI) 708 (e.g., a mouse, a keyboard, a display, for example). The non-volatile memory 706 stores computer instructions 712, an operating system 716 and data 718. In one example, the computer instructions 712 are executed by the processor 702 out of volatile memory 704. In one embodiment, an article 720 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer.

Processing may also be implemented as a machine-readable storage medium, configured with a computer program, where upon execution, instructions in the computer program cause the computer to operate.

Processing may be performed by one or more programmable embedded processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A speed sensor for a vehicle, comprising:

a first detection module having a first sensing element, wherein the first detection module is configured to detect speed of a wheel for a moving vehicle during a first mode of operation that is active when the vehicle is moving; and a second detection module having a second sensing element, wherein the second detection module is configured to detect movement of the target after a period of no movement during a low power mode of operation, wherein the target comprises a wheel, wherein the low power mode is operative when the vehicle is parked, wherein the second detection module is configured to generate a wake up signal for increasing brake pressure by the vehicle after movement of the wheel is detected.

2. The speed sensor according to claim 1, wherein the second detection module is configured to detect movements at selected time intervals.

3. The speed sensor according to claim 2, wherein the second detection module is configured to compare an output of the second sensing element to a threshold at the selected time intervals.

4. The speed sensor according to claim 3, wherein the second detection module is configured to generate the wake up signal when the output of the second sensing element exceeds the threshold.

5. The speed sensor according to claim 1, wherein the first sensing element comprises GMR elements.

6. The speed sensor according to claim 1, wherein the second sensing element comprises a Hall element.

7. The speed sensor according to claim 1, wherein the target comprises an ABS tone ring.

8. The speed sensor according to claim 7, wherein the target comprises a ring magnet.

9. The speed sensor according to claim 1, wherein the first detection module comprises a current source controlled by a controller and the second detection module comprises a comparator coupled to the current source.

10. A method, comprising:

employing a first sensing element in a first detection module in a speed sensor to detect speed of a wheel for a moving vehicle during a first mode of operation that is active when the vehicle is moving; and employing a second sensing element in a second detection module to detect movement of the target after a period of no movement during a low power mode of operation, wherein the target comprises a wheel, wherein the low power mode is operative when the vehicle is parked, wherein the second detection module is configured to generate a wake up signal for increasing brake pressure by the vehicle after movement of the wheel is detected.

11. The method according to claim 10, wherein the second detection module is configured to detect movements at selected time intervals.

12. The method according to claim 11, wherein the second detection module is configured to compare an output of the second sensing element to a threshold at the selected time intervals.

13. The method according to claim 12, wherein the second detection module is configured to generate the wake up signal when the output of the second sensing element exceeds the threshold.

14. The method according to claim 10, wherein the first sensing element comprises GMR elements.

15. The method according to claim 10, wherein the second sensing element comprises a Hall element.

16. The method according to claim 10, wherein the target comprises an ABS tone ring.

17. The method according to claim 16, wherein the target comprises a ring magnet.

18. The method according to claim 10, wherein the first detection module comprises a current source controlled by a controller and the second detection module comprises a comparator coupled to the current source.

* * * * *